Aug. 26, 1924.
I. BENKÖ
TOOL HOLDER
Filed July 19, 1921  2 Sheets-Sheet 1
1,506,331
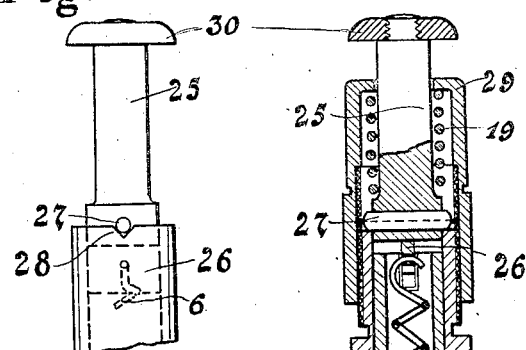
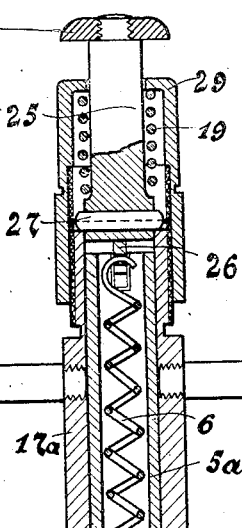
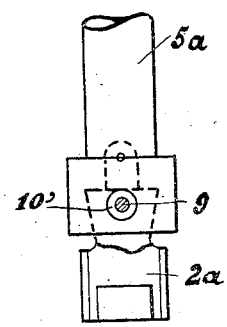
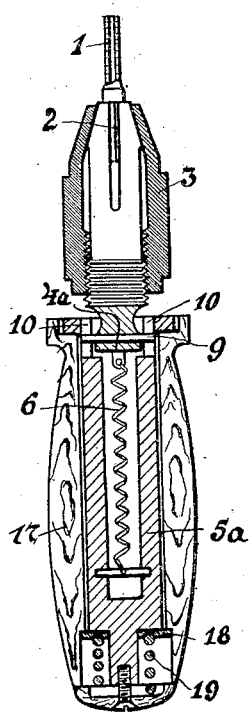
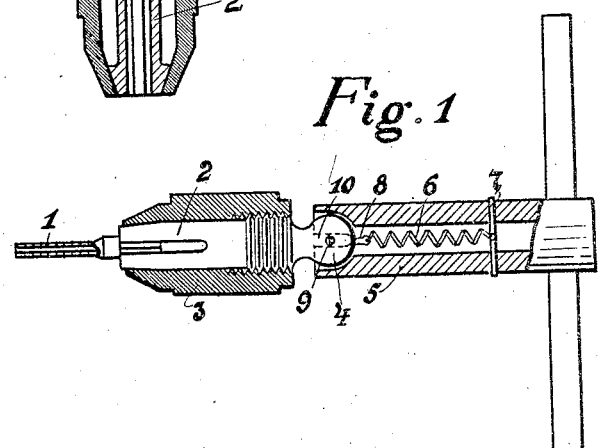
Inventor:
Ivan Benkö
By Lawrence Langner
Attorney Aug. 26, 1924.
I. BENKÖ
TOOL HOLDER
Filed July 19, 1921 2 Sheets-Sheet 2
1,506,331
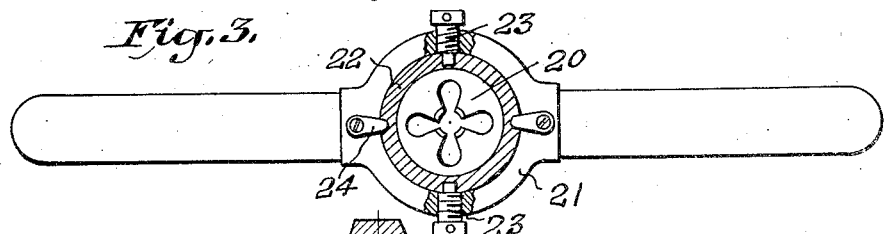
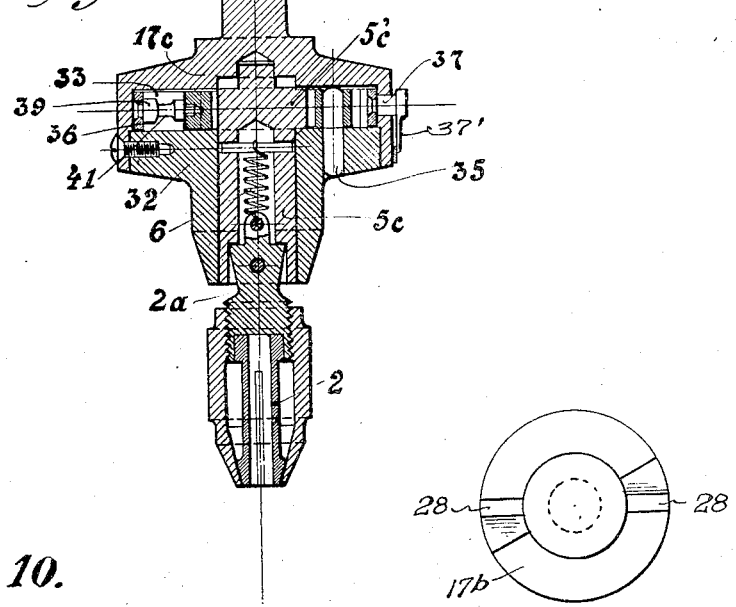
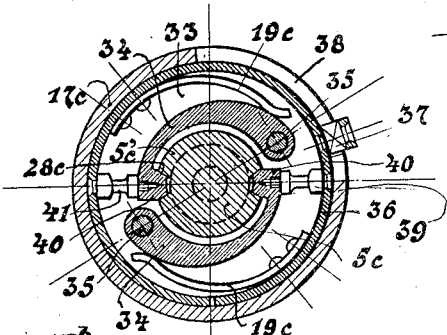
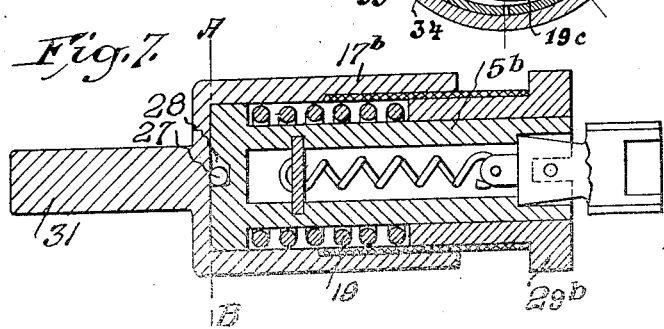
Inventor:
Ivan Benkö
Lawrence Langner
Attorney

Patented Aug. 26, 1924.

1,506,331

UNITED STATES PATENT OFFICE.

IVÁN BENKÖ, OF VIENNA, AUSTRIA.

TOOL HOLDER.

Application filed July 19, 1921. Serial No. 485,945.

(GRANTED UNDER THE PROVISIONS OF THE ACT OF MARCH 3, 1921, 41 STAT. L., 1313.)

*To all whom it may concern:*

Be it known that I, IVÁN BENKÖ, a citizen of Austria, residing at Vienna, Austria, have invented certain new and useful Improvements in Tool Holders (for which I have filed an application in Austria, July 7, 1920), of which the following is a specification.

This invention relates to a rotary drilling screw-cutting and reaming device, in which the cutting tool is laterally and axially yielding, but prevented from rotating in any other but the direction of working, so that by the exertion of an eccentric or angular pressure, the tool will yield laterally and thus obviate incorrect boring or a breaking of the tool.

When working with a screw-tap, and particularly with one of a small size, considerable skill is demanded of the operator. It frequently happens, that so many screw-taps are broken, that the work does not pay. The rapid cutting of threads does not entirely depend on the operator, but also on the quality of the screw-tap employed and on the material to be tapped. The screw-tap consists of steel and hitherto no guarantee could be given, that the tap would not break, if the device were rotated eccentrically, or when such an amount of chips were collected, that the progress of the tap would be checked. The result is not only the breakage of the screw-tap, but sometimes it is even impossible to remove the broken off end of the screw-tap from the material to be screw-threaded; this being particularly the case, if it is impossible to anneal the article in order to again drill a hole therein.

The present invention removes these drawbacks and it permits cutting a clean screw-thread cutting in that an eccentrically engaging screw-tap will yield laterally and pass truly and properly into the drilled hole. According to this invention also breakage of the screw-stocks of screw-dies and of reamers or of the piece of work in which it works and the consequent injury to the operator is effectively prevented.

Various modes of carrying out the present invention are illustrated by way of example on the accompanying sheets of drawings, in which—

Fig. 1 shows a hand operated screw-tap, but if desired, the same may be fixed in a chuck.

Fig. 2 shows a yieldingly secured tool, in which the rotary motion is frictionally transmitted by means of a handle.

Fig. 3 illustrates a screw-die according to the present invention.

Fig. 4 is a longitudinal section through a hand operated device, and

Figs. 5 and 6 are details thereof.

Fig. 7 is a longitudinal section through a modified construction,

Fig. 8 is a plan view of its inner sleeve.

Figs. 9 and 10 are longitudinal and cross-section views respectively of a device particularly adapted for mechanical operation.

The tap 1 is in known manner held between jaws 2, pressed against the upper part of the shank by a sleeve 3. In order to permit a lateral movement of the tap, the end 4 of the jaws is of spherical shape and a spring 6 presses the same into the correspondingly recessed sleeve 5. A cross-pin 7 secures the one end of the spring to the sleeve 5, while its other end is attached to an eye 8 of the spherical head 4 and allows a lateral play of the tool with respect to its longitudinal axis. The spherical head 4 is provided with a cross-pin 9 located in slots 10 of the sleeve 5, so that the rotary motion of the latter is transmitted to the head 4 and consequently also to the tap 1. This arrangement renders it possible, for the tap to adjust itself truly and properly axially with respect to the longitudinal axis of the drilled hole even in those cases, in which it has not been properly, e. g. centrally, introduced into the hole, so that even frail taps will not break.

In the construction illustrated in Fig. 2, the end of the jaws 2 is provided with a flat disc 4$^a$, which permits the lateral yielding of the jaws. In order to transmit rotary movement from the handle 17 to the tap 1, the disc 4$^a$ is provided with a cross-pin 9, whose free ends engage in slots 10 of the sleeve 5$^a$. The transmission of the rotary motion from the handle 17 to the sleeve 5$^a$ is accomplished by friction, which may be regulated by spring tension, so that only a moment of torsion, depending on the prevailing friction, is transmitted from the drive (which in this case is the hand-operated handle) to the tool. Of course the same idea may be employed for mechanically driven tools, and on exceeding a certain limit of the resistance opposed to the reduction of the tension, which depends on the adjusted friction, a breaking of the tool will be prevented, because the driving portion, e. g. the handle 17 will slip on the sleeve 5ª, if the resistance exceeds a given limit.

A flange or disc 18 transmits the rotary motion of the handle 17 to the sleeve 5ª, the said disc being pressed against the handle by a spring 19.

In screw-dies (Fig. 4), the screw dies may easily break in case the operator exercises an oblique pressure. In order to prevent damage to the tool the screw dies 20 are arranged in a preferably annular frame 22, which is movably mounted in the screw-stock 21. The frame swings on pin 23 passed through the screw die and is retained in its normal position by a flat spring 24.

In the modification illustrated in Figs. 4 to 6, the tool is retained in jaws 2 removably and exchangeably located in tool-carrier 2ª. The flat end of the latter rests in a recess of the sleeve 5ª, so that on the lateral deflection of the tool from the longitudinal axis, the same will, when laterally deflected always rest on the border line and after the discontinuation of the force causing the said lateral deflection, the jaws will be adjusted axially by the spring 6. One end of the latter is secured to the tool-carrier 2ª and its other end is attached to a part cooperating with the sleeve 5ª, for instance to a coupling bolt 25 or to a cross-pin 27 playing in suitable slots of the sleeve 5ª. The cross-pin 9 prevents an undesirable stretching of the spring 6 and a pulling off of the tool carrier 2ª from its seat and it also causes the rotation of the said carrier, the ends of the said cross-pin 9 being located in suitably dimensioned slots 10′ of the sleeve 5ª. The transmission of the rotary motion from the outer sleeve 17ª, which is the driving member, to the inner sleeve 5ª is effected by a coupling member, adapted to be automatically disengaged when the resistance on the tool exceeds a given limit. The cross-pin 27 serves as the coupling member. The said pin is passed through the axially movable bolt 25 and its ends rest in notches 28 of the driving sleeve 17ª. The bolt 25 is provided with a projection 26, which enters into slots formed in the wall of the sleeve 5ª and thus the connection between the sleeves 17ª and 5ª is established by means of the frictional engagement of the pin 27 in the notches 28. If the resistance on the tool and therefore also the required driving force for the sleeve 17ª, exceeds a given frictional limit, the pin 27 slides upwardly on the incline of the notch 28, thereby interrupting the connection between the outer sleeve 17ª and the bolt 25 and thus also between the former and the inner sleeve 5ª. The amount of friction between the pin 27 and the part 28 depends on the pressure exerted by the spring 19 upon the movable bolt 25; the said friction being adjusted by any desired means. Thus breakage of the tool is prevented. In order to attain a strong coupling between the driving and the driven sleeves, when fixing or detaching the tool, the free end of the bolt 25 is provided with a hand actuated knob 30, by which the cross-pin 27 may be pressed into engagement with the notch 28.

An arrangement similar to the last described construction is illustrated in Fig. 7. This device is particularly suited for tapping tools. Also in this arrangement, a cross-pin 27 couples the driven inner sleeve 5ᵇ to the driving outer sleeve 17ᵇ, the said cross-pin being located in an inclined notch 28 of the inner sleeve 5ᵇ and its free ends being secured in the wall of the outer sleeve 17ᵇ. The spring 19 determines the force transmitted from the driving sleeve to the driven sleeve, e. g. the amount of resistance on the tool up to which the drive will act and the tension of the spring is determined by an adjustable ring 29ᵇ. The device may be fixed in the machine by a shank 31 on the outer sleeve and if the tool or rather the inner sleeve 5ᵇ is prevented from rotating by a predetermined resistance, the pin 27 slides out of the notch 28 and breaks the connection between the driving and the driven sleeves.

The device illustrated in Figs. 9 and 10 is particularly adapted for mechanical operation and may be used for screw-taps, twist drills or reamers. The jaws 2 are removable and exchangeable and by a suitable adjustment of the coupling member between the driving and driven members, the device may be used for tools of various sizes, for instance for tools with a diameter of from 1 to 10 millimeters.

The driven member 5ᶜ is located axially within the driving member 17ᶜ and the tool-carrier 2ª is suspended from or arranged in the former. A flanged sleeve 32 is fitted into the driving member 17ᶜ and closes the hollow space 33 formed in the interior of the latter. This sleeve also surrounds the driven member 5ᶜ and serves as a bearing for the latter. The upper end of the member 5ᶜ is provided with a flange 5′ᶜ which engages with the flanged portion of the sleeve 32, thereby securing the member 5ᶜ against axial movement with respect to the member 17ᶜ and by means of pawls 34 transmits the driving motion from the member 17ᶜ to the member 5ᶜ. The pawls 34 are adapted to turn on pins 35 secured to the sleeve 32 and each pawl engages a notch 28ᶜ in the member 5ᶜ. The engaging portions of the pawls and the notches are tapered, so that the connection between these two members is suited for the transmission of certain forces only. If the transmitted force exceeds a given limit, the pawl will be disengaged from the notch 28°, e. g. it will slip out of the same. The force to be transmitted depends on the spring-pressure, exerted on the pawl or on the distance between the bolt 35 and the contacting face of the spring 19° pressing upon the pawl. According to the present invention, this distance may be regulated. In the illustrated construction, the pawl-springs 19° are adjustable, so that the same may rest on the pawl either close to the pin 35, e. g. with a very small leverage or engage the pawl farther away from the pin 35, e. g. nearer to the contacting end 40 of the pawl. The springs 19° are secured to a ring 36 located in the hollow space 33 of the driving member 17°; the said ring 36 being provided with a knob 37 extending through a slot 38 of the member 17° and may be rotated from the outside. If desired, the knob 37 may be furnished with a pointer 37' playing on a scale arranged on the outside of the member 17°. The arrangement is such, that by means of the pawls a rigid connection may be established between the members 17° and 5°; this being accomplished by bolting or locking the engaging ends of the pawls to the flange 5'° of the member 5°. To attain this object, the device is provided with a locking arrangement secured to the adjustable ring 36. As illustrated in the drawing, projections 39 are fixed to the ring 36 which rest against the engaging end of the pawl or against pins 41 carried by the engaging end of the pawl and thereby lock the pawl against movement. Thus by rotating the adjustable ring 36 in the direction of the engaging end of the pawl, the force of the transmitted power or the resistance on the tool, which has to be overcome by the device, may be regulated, to suit the diameters of various tools and further the driving and driven members may be locked together, in order to simplify or permit the engagement or disengagement of the tool.

In this device the laterally yielding arrangement 6 may be dispensed with, e. g. the device may be used as an ordinary rigid tool. Even in this case the device will act properly and the disconnection of the drive will be automatically produced, when the resistance on the tool exceeds a certain adjustable limit and thus breakage of the tool will be prevented.

I have described my invention by a few possible forms of construction, but I wish it to be understood, that my invention is not limited thereby in its scope.

Having thus described my invention what I claim as new and desire to secure by Letters Patent is:

1. A tool-holder comprising in combination a driving member, a flat ended frictionally driven member for the cutting tool connected to the driving member by the said end to permit a laterally swinging yielding movement of the driven member and an adjustably positioned spring secured to the driving member to regulate the friction between the driving and driven members.

2. A tool-holder comprising in combination a driving member, a driven member for the cutting tool laterally and axially yieldingly coupled to the driving member and a spring axially located in the driven member adapted to be rotated by the latter and permitting of a lateral swinging motion of the axis of the tool.

3. A tool-holder comprising in combination a driving member, a driven member for the cutting tool laterally and axially yieldingly coupled to the driving member, a sleeve arranged between the driving and driven members and adapted to be driven by the driving member, and a spring axially located in the said sleeve adapted to be rotated by the latter and coupling the said two members with one another, said spring permitting of a lateral swinging motion of the axis of the tool.

4. A tool-holder comprising in combination, a driving member, a driven member for the cutting tool, a spring axially located within the driven member, said spring engaging the tool gripping means and permitting of a lateral swinging motion of the axis of the tool, the said driven member coupled to the driving member by coupling means secured to one of the said members and adapted to engage the other member to rotate the driven member, and an adjustably positioned spring engaging the said coupling means in such manner, as to normally force the latter into engagement with the member to which it is to be coupled, but to automatically interrupt the coupling between the said coupling means and this member, when the resistance on the cutting tool exceeds a certain limit.

5. A tool-holder provided with means to prevent a dangerous torsion of the tool, a coupling for such means and jaws at such coupling for connecting and automatically disconnecting the driving part with the driven part, springs for the jaws for securing the engagement between the driving part and the driven part according to the action of the springs on the jaws and means for displacing the springs upon the jaws.

6. A tool-holder comprising in combination, a driving member, a driven memper for the cutting tool adapted to be coupled to the driving member, an adjustable member arranged between the driving and driven members, coupling means secured to one of the said members and adapted to engage the other member to rotate the driven member, and a spring secured to the said adjustable member and engaging the said coupling means in such manner, as to normally force the latter into engagement with the member to which it is to be coupled, but to automatically interrupt the coupling between the said coupling means and this member, when the resistance on the cutting tool exceeds a certain limit.

7. A tool-holder comprising in combination, a driving member, a driven member for the cutting tool coupled to the driving member by coupling means secured to one of the said members and adapted to engage the other member to rotate the driven member, an adjustable spring engaging the said coupling means in such manner, as to normally force the latter into engagement with the member to which it is to be coupled, but to automatically interrupt the coupling between the said coupling means and this member, when the resistance on the cutting tool exceeds a certain limit, and locking means secured to the driving member and adapted to be brought into engagement with the coupling means to lock the latter to the driven member.

8. A tool-holder comprising in combination, a driving member, a driven member for the cutting tool adapted to be coupled to the driving member, an adjustable member arranged between the driving and driven members, coupling means secured to one of the said members and adapted to engage the other member to rotate the driven member, a spring secured to the said adjustable member and engaging the said coupling means in such manner, as to normally force the latter into engagement with the member to which it is to be coupled, but to automatically interrupt the coupling between the said coupling means and this member when the resistance on the cutting tool exceeds a certain limit, and locking means secured to the adjustable member and adapted to be brought into engagement with the coupling means, to lock the latter to the driven member.

9. A tool-holder comprising in combination, a driving member, a driven member for the cutting tool adapted to be coupled to the driving member, a hollow space provided between the said two members, an adjustable ring located in the hollow space, the said ring being adjusted from outside, a pawl arranged in the hollow space and secured to one of the said members and adapted to engage the other member to rotate the driven member, a spring secured to the said adjustable ring and engaging the said pawl in such manner, as to normally force the latter into engagement with the member to which it is to be coupled, but to automatically interrupt the coupling between the said pawl and this member, when the resistance on the cutting tool exceeds a certain limit, and locking means secured to the adjustable ring and adapted to be brought into engagement with the pawl, to lock the latter to the driven member.

10. A tool holder comprising, in combination with a driving member and a coaxial driven member, arms pivotally mounted on one of these members, said arms being provided with projections on their free ends having at least one of their sides inclined to the radius and engageable with corresponding notches on others of the said members, springs acting on the outer sides of the arms in a substantially radial direction, a carrier rotatably adjustable relatively to the member carrying the arms, said springs being secured to the carrier.

In testimony whereof I affix my signature.

IVÁN BENKÖ.

Witness:
RICHARD KOMINIK.